United States Patent Office 3,125,620
Patented Mar. 17, 1964

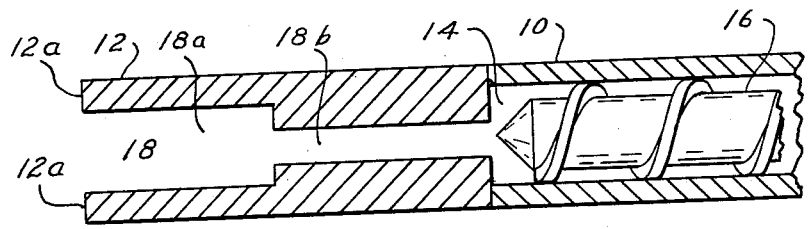
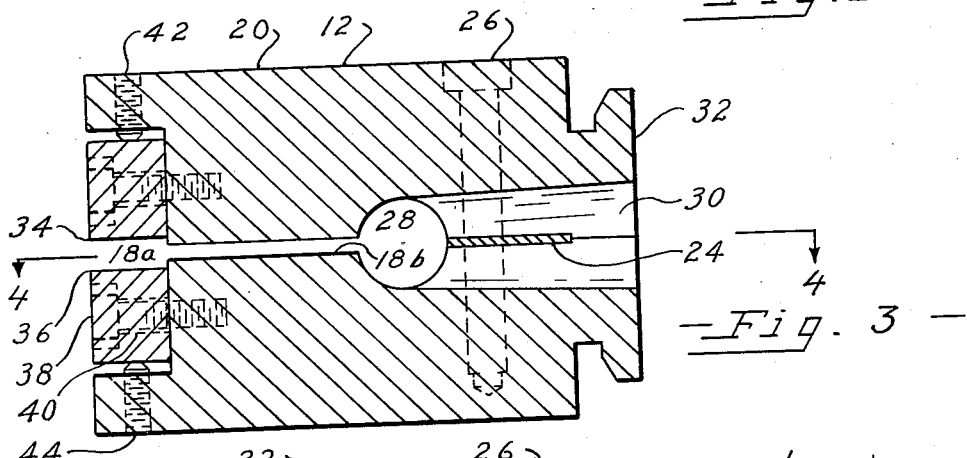
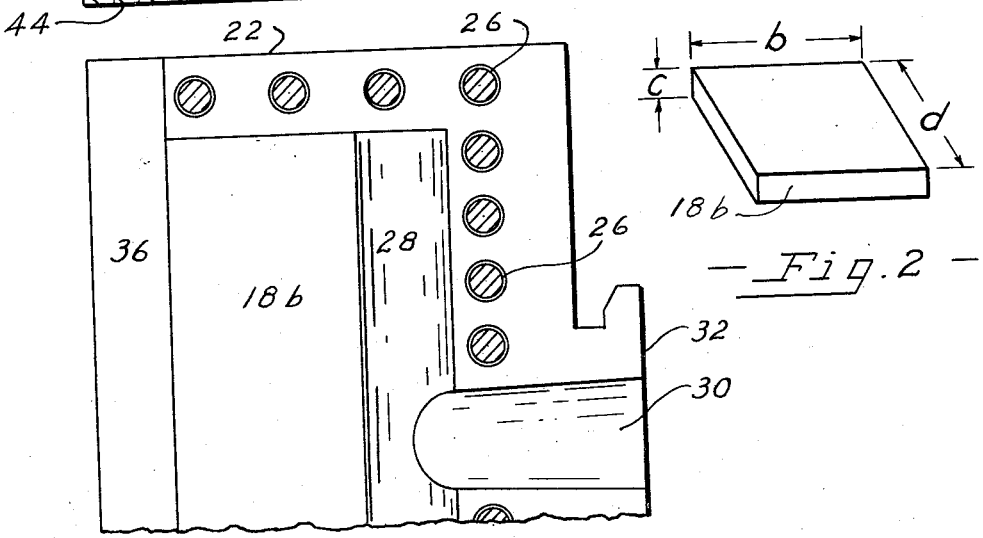
STANLEY JOHN SKINNER INVENTOR.
ATTORNEY.

3,125,620
PROCESS FOR PROVIDING IMPROVED SURFACE GLOSS ON ARTICLES PRODUCED BY EXTRUDING THERMOPLASTIC SYNTHETIC RESINS
Stanley John Skinner, Malpas, Newport, England, assignor to Monsanto Chemicals Limited, London, England, a British company
Filed Nov. 30, 1960, Ser. No. 72,672
Claims priority, application Great Britain Dec. 1, 1959
6 Claims. (Cl. 264—176)

This invention relates to a process for improving the surface gloss of thermoplastic resins, particularly when they are in the form of sheets, tubes or other sections.

Articles manufactured from a thermoplastic synthetic resin are normally formed into shape when the resin is softened by heat, the shaped articles then hardening as they cool. The appearance of the finished article, for instance the surface smoothness or gloss, depends mainly upon the particular thermoplastic resin employed, and, with many resins excellent results are obtainer without taking any special precautions. However, there are certain thermoplastic resins where in practice it is difficult to obtain a surface having a good gloss. This is often so for instance where the resin is heterogeneous to some degree, in that it contains a phase which has a viscoelastic characteristic that is different from that of the bulk of the material.

It is an object of this invention to provide improved surface gloss on articles extruded from thermoplastic synthetic resins.

Other objects of the invention will in part be obvious and will in part appear hereinafter.

These and other objects of the present invention are attained by practice of the present invention in which thermoplastic synthetic resin while in a softened state is directed through the die of an extruder, the said die having a die restriction positioned centrally within the die channel and adjacent to the die lips, the said die restriction having a frontal cross-section (measured at right angles to the resin flow) essentially of the same geometrical design as that of the final extruded section and being such that it exerts a back-pressure on the softened resin of at least 900 pounds per square inch.

The accompanying drawings are included in the case for the purpose of illustration, wherein:

FIGURE 1 is a cross-sectional diagrammatical view with parts broken of an extruder die head including an embodiment of the featured die restriction.

FIGURE 2 is a view in perspective of an embodiment of the die restriction where the frontal cross-section of the said die restriction is in the form of a slit.

FIGURE 3 is a sectional side elevation of a die head embodying the featured die restriction, and FIGURE 4 is a horizontal section along the line 4—4 of FIGURE 3.

Referring to the drawings wherein like numbers refer to like parts throughout, and first to FIGURES 1 and 2; an extruder, not generally shown, is fitted at the discharge end of its barrel 10 with a die head 12. Fitting can be effected in any convenient manner. Extruder barrel 10 is provided to its interior bore 14 with longitudinally aligned screw 16. Die head 12 has an interior die channel 18 passing through the same and communicating directly with extruder barrel bore 14.

Die channel 18 defines two zones, the first is the discharge zone 18a which is of normal profile (vertical consideration) while the second zone 18b which is located between zone 18a and barrel interior 14 is of restricted profile when considered relative to the profile of zone 18a, and constitutes a die restriction, again 18b. Discharge zone 18a is defined within die-lips 12a which are shown as an integrated frontal projection of die head 12, while die restriction 18b is located adjacent to and upstream of the said die lips and similarly discharge zone 18a. FIGURE 1 specifically refers to the length of die lips 12a and similarly discharge zone 18a as $a$ and the length of die restriction 18b as $b$. FIGURE 2 serves to indicate perspectively, the remaining dimensions of die restriction 18b. The profile of the said die restriction 18b is referred to as $c$ while the width of the same is referred to as $d$.

The die restriction 18b is located centrally of die channel 18 and is essentially of the same geometrical configuration, frontal cross-section, as that of the section designed to be extruded. Thus, in extruding a sheet, the frontal cross-sectional configuration, reference to width $d$, of the die restriction 18b is a slit; in extruding a circular rod it is circular; and in extruding a tube it is annular. Normally, the frontal cross-sectional configuration of the die restriction 18b is the same geometrical shape (although not of course the same size) as that of the final section, but there can, if desired, be minor differences practiced.

In general, an extruder can be adapted to make it suitable for practice of the invention by incorporation of a suitable die restriction within the die channel adjacent to the die lips. In practice, this normally means that the extruder is equipped with the die head of this invention.

The die restriction can for instance be introduced in a die by insertion of a plate bearing the die restriction. In making a sheet of resin, the other conventional components of a die, for example a weir plate or a spreader bar, can be present. The plate bearing the die restriction can conveniently be placed between the weir plate and the die lips; an alternative position that is sometimes appropriate is between the weir plate and the spreader bar. In general, the necessary die restriction can be produced in any desired way. For example, instead of introducing the restriction in a removable plate another method is to design a die from first principles so that there is a restriction, of perhaps 0.005 or 0.01 inch, in the channel for the resin before it opens out into the die lips.

The die restriction formed in the die channel of the die produces high back-pressure on the screw side of the die restriction. The softened resin then leaving the die restriction is able to "relax" from the effect of the high pressure existing on the other side of the die restriction, and this relaxation (that is to say the achievement of a substantial degree of elastic recovery) occurs between the die lips before the sheet or other extruded section is given its final shape.

The back-pressure produced by the die restriction is often more than 1000 pounds per square inch, for instance more than 1200 pounds per square inch. In general where other conditions are suitable the pressure can be in the range of 900 to 3,500 pounds per square inch, for instance 1000 to 2,500 pounds per square inch. Good results can often be obtained in the range of 1200 to 2000, for instance 1500 pounds per square inch.

The precise dimensions of the die restriction necessary to provide the desired back-pressure in any particular circumstance can readily be found. By way of example, if a sheet is to be extruded the restriction will be a slit in configuration (normally a rectangle), the width $d$ in FIGURE 2 of the slit being the same as the sheet width, and the profile $c$ of the slit being in the range of 0.001 to 0.02 inch, for example in the range of 0.002 to 0.015 inch. Excellent results are obtainable with a profile for the slit in the range of 0.003 to 0.0125 inch, for instance 0.007 or 0.01 inch. If the frontal cross-section, referred to in width as $d$, of the die restriction is a configuration other than a slit, appropriate dimensions can be of a comparable order to those outlined above. Thus, if the die restriction is circular in configuration, the diameter which now corresponds to width as used above, can for instance be 0.007 or 0.01 inch; and, if annular it can also have a radial width of 0.007 or 0.01 inch. The length b of the die restriction does of course contribute to the production of the high back-pressure; it can for example be in the range of 0.25 to 4 inches, as for instance in the range of 0.5 to 3 inches. The precise length b of the die restriction is not particularly critical; good results are obtained for example with a length of 2 or 3 inches.

The softened resin "relaxes" in the discharge zone of the die zone diffused between the die lips from the effects of the high back-pressure, before it emerges as the final sheet of other section. The length a in FIGURE 1 of the die lips and similarly the discharge zone can conveniently be in the range of 0.25 to 8 inches, for instance 0.5 to 5 inches.

The improved gloss which results from extruding thermoplastic resins using extruder die heads including the die restrictions located in their die channels as presently featured, is present on both surfaces of the sheet or other section; for instance both the inside and the outside surfaces of a tube will be smooth and glossy.

The construction of a die according to the invention which is suitable for extruding a sheet 17 inches wide and 0.06 inch thick of a thermoplastic resin will now be described with reference to accompanying FIGURES 3 and 4.

The body of the die 14 comprises two steel blocks, an upper block 20 and a lower block 22 having partially interposed between them an 0.01 inch thick steel shim 24. The surfaces of the blocks which are in contact with the shim 24 are ground flat, and the said blocks are held tightly together by a number of steel bolts such as are indicated at 26. A manifold 28, and a die-entry 30, which intercommunicate are formed by channels machined in the ground surfaces of the blocks. Entrance to die-entry 30 is provided for through adaptor 32, which can be removably fitted onto the discharge end of an extruder barrel (not shown). Two straight parallel die lips 34 and 36 are positioned as shown by bolts 38 bolted through slotted apertures 40 to the front of blocks 20 and 22 respectively, the distance vertically separating the lips, one from the other, being capable of adjustment by means of the screws 42 and 44 respectively. The length of the die lips is one inch. Shim 24 is cut away in the portions corresponding to the manifold 28 and the die-entry 30 and also in a rectangular area 18b so that there is a very narrow profile again 18b of 0.01 inch constituting the die restriction 18b defined longitudinally between the manifold 28 and the inner extremes of die lips 34 and 36. The frontal width of the die restriction 18b is 17 inches, the profile 0.01 inch and the length 3 inches. Electric heaters (not shown) are placed around the outer surfaces of blocks 20 and 22 to assist in maintaining the thermoplastic synthetic resin in a softened condition.

In use, softened resin discharged from an extruder barrel flows in turn through the die-entry 30, the manifold 28 and the die restriction 18b. The resistance to flow offered by the restriction 18b causes the resin to fill the manifold 28 under a considerable pressure which is substantially uniform along the whole width of the said manifold, so that the resin flows at a uniform rate through the die restriction 18b and discharge zone 18a defined by die lips 34 and 36, from which it is discharged in the form of a sheet. The thickness of the sheet of thermoplastic material which results can be adjusted if desired by varying the profile distance between the said die lips.

The extrusion apparatus and process of the present invention are particularly effective in an extrusion directed to the production of sheets and other sections from a thermoplastic resin constituting a modified polymer. Resins of this kind often contain two phases of different visco-elastic characteristics. Examples of such resins are the toughened polystyrenes, comprising polystyrene containing blended or copolymerized natural or synthetic rubber; toughened polyvinyl chlorides; and styrene-acrylonitrile copolymers and blends. However, the thermoplastic resin need not necessarily be a mixture of different polymeric materials in this way, and the process of the invention can for instance be used with other polymers or copolymers, for instance polyethylene (high or low density) or nylon, where an improved surface gloss can be obtained.

The process of the invention is illustrated by the following example:

*Example 1*

This example describes the production by extrusion of a sheet of a toughened polystyrene containing a styrene-butadiene synthetic rubber; the sheet is extruded using various back pressures in order to compare the quality of the gloss obtained.

The extruder if fitted with a die head having die lips capable of forming a sheet of resin 3 inches wide and 0.06 of an inch thick. At a distance of 1 inch from the die lips there is a die restriction of variable profile in the form of a narrow slit having a width (frontal) of 3 inches (corresponding to the 3 inch width of the sheet of resin) and 1 inch long. The pressure in the manifold behind the restriction is capable of being measured by means of a Bourdon pressure gauge.

Using a manifold temperature of 210° C., the die profile restriction size is varied. First, the profile of the die restriction is adjusted to provide a back-pressure of 1500 pounds per square inch. Then, the procedure is repeated in which the profile of the die restriction is further narrowed or restricted to provide a back-pressure of 2,000 pounds per square inch. Finally, extrusion is carried out in the absence of any restriction, so that the pressure on the screw is only 250 pounds per square inch.

The degree of gloss present on specimens from all three sheets is then determined using a gloss meter described in the Journal of Oil and Colour Chemists Association, 1953, page 545. This meter measures the reflectance of a beam of light thrown on a sheet at 45°. A figure in the range of 20–70 obtained from the meter indicates different amounts of finish ranging from a relatively dull matte surface (Figure of 20) to one which has a certain amount of gloss. A figure above 90 represents a very high gloss.

When the sheets produced above are tested in the specified gloss meter the following results are obtained.

| Back pressure (pounds per square inch): | Gloss |
|---|---|
| 1500 | 97 |
| 2000 | Over 100 |
| 250 | 60 |

These results indicate that use of a back-pressure of 1500 or more pounds per square inch in the process of the invention results in a very significant improvement in the gloss of a sheet made from the toughened polystyrene resin.

It will thus be seen that the objects set forth above, among those made apparent from the preceding description, are efficiently attained, and, since certain changes can be made in carrying out the above process and in the construction set forth without departing from the scope of the invention, it is intended that all matter contained in the above description and shown in the accompanying drawing shall be interpreted as illustrative and not in a limiting sense.

What is claimed is:

1. A process for the production of a shaped article of synthetic thermoplastic resin which comprises the steps of passing said resin in a softened state (1) through a die restriction located in the die channel of an extruder die head and (2) between die lips for determining the final form of said shaped article, while maintaining a high back-pressure of at least 900 pounds per square inch on the softened resin, the said die restriction positioned centrally in the said channel and adjacent to the die lips, and having a frontal cross-section essentially of the same geometrical shape as that of the final extruded section.

2. A process according to claim 1, in which the back-pressure which results is between 1,000 and 2,500 pounds per square inch.

3. A process according to claim 1, in which the back-pressure which results is more than 1,200 pounds per square inch.

4. A process for the production of a sheet according to claim 1, in which the synthetic thermoplastic resin is a toughened polystyrene.

5. A process according to any of claim 1, in which the synthetic thermoplastic resin is polyethylene.

6. A process according to claim 1 in which the synthetic thermoplastic resin is toughened polyvinyl chloride.

References Cited in the file of this patent
UNITED STATES PATENTS

| | | |
|---|---|---|
| 1,862,947 | Smith et al. | June 14, 1932 |
| 2,332,829 | Parsons et al. | Oct. 26, 1943 |
| 2,479,804 | Bailey | Aug. 23, 1949 |
| 2,537,977 | Dulmage | Jan. 16, 1951 |
| 2,649,618 | Rhodes et al. | Aug. 25, 1953 |
| 2,702,408 | Hartland | Feb. 22, 1955 |
| 2,719,330 | Stott | Oct. 4, 1955 |
| 2,971,222 | Weissman | Feb. 14, 1961 |
| 2,975,475 | Heston | Mar. 21, 1961 |

FOREIGN PATENTS

| | | |
|---|---|---|
| 551,760 | Belgium | Dec. 31, 1959 |